April 11, 1933.  P. LETRILLIART  1,903,680

ALTERNATING CURRENT GENERATOR

Filed June 15, 1928  2 Sheets-Sheet 2

Inventor: Pierre Letrilliart,
By: Smith & Michael,
Attorneys.

Patented Apr. 11, 1933

1,903,680

UNITED STATES PATENT OFFICE

PIERRE LETRILLIART, OF PARIS, FRANCE, ASSIGNOR TO FORGES & ATELIERS DE CONSTRUCTIONS ELECTRIQUES DE JEUMONT, OF PARIS, FRANCE, A FRENCH SOCIÉTÉ ANONYME

ALTERNATING CURRENT GENERATOR

Application filed June 15, 1928, Serial No. 285,631, and in France June 18, 1927.

This invention relates to electric generators of the variable speed or asynchronous type.

Cascade groups including commutator machines for frequency changing have already been used for regulating the speed of induction motors with a good power factor.

The present invention has for its main object the provision of an alternating current generator of substantially constant voltage and frequency, adapted to be driven at variable speed.

The invention consists of a variable speed or asynchronous electric generator formed by a cascade group which includes a double or two-part frequency changer, this combination presenting certain special characteristics applying only to a specific method of operation of the cascade group, the whole combination being arranged with a view to obtaining regulation of the speed and of the power factor by a single control, with a high torque at all rates of working.

The invention is hereafter described with reference to the accompanying drawings, in which.

Asynchronous motors are already known comprising a cascade group with the frequency changer divided into two distinct three-phase machines, capable of the same diametrical voltage, each of the commutators being arranged to carry half the current; by shifting the brushes upon the two commutators relatively to each other, the magnitude of the voltage thereby impressed upon the rotor of the main motor can be varied according to the resultant chord of the displaced radii, but it is not possible to vary the speed as much as this voltage variation should allow, because the machine will then be used inefficiently, the power factor and the torque becoming inadmissibly low for angular displacements of the brushes beyond a small angle.

The invention consists in the application of a similarly divided double or two-part machine in cascade connection with an asynchronous machine for use as a variable speed generator, in which the two frequency changers provide unequal voltages, the required resultant voltage to be impressed on the main rotor being obtained simply by symmetrical shifting of the two sets of commutator brushes, and further in a particular construction of the double or two-part frequency changer.

Such a machine is suitable for example in the case of power derived from a waterfall having a variable flow. The speed of the turbine driven by the water may vary in the proportion of one to two for example, it being desired to transform the varying mechanical power into electrical power at constant voltage and frequency.

The application of a divided or two-part commutator frequency changer, formed by two slightly different machines, does not present any practical difficulty, because a single transformer with two sets of secondary windings can feed both sets of slip rings of the two frequency changers.

Figure 1:
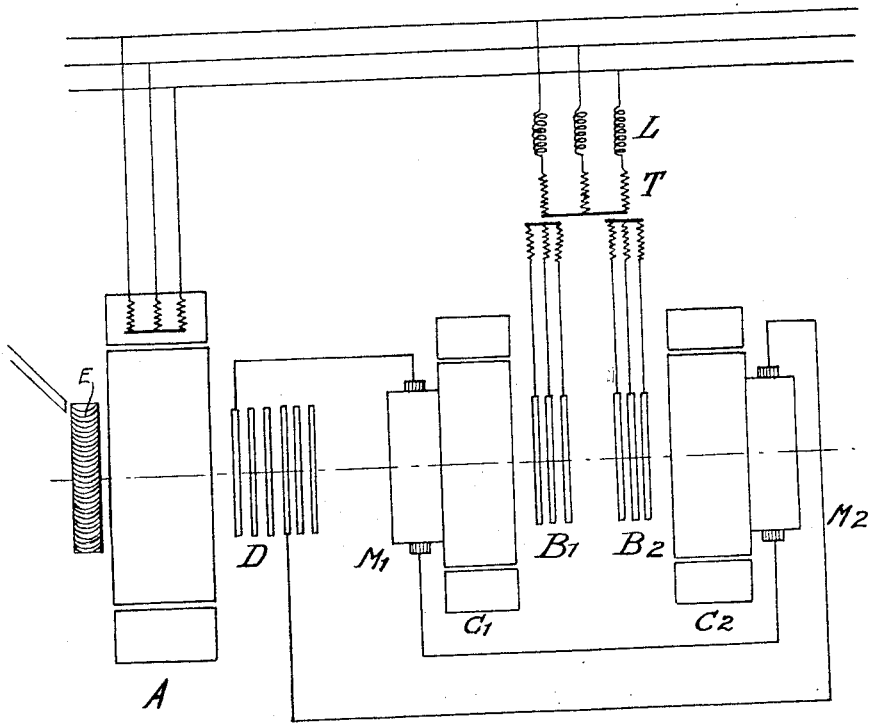
Figure 1 represents diagrammatically an asynchronous generator according to the invention.
Figure 2:
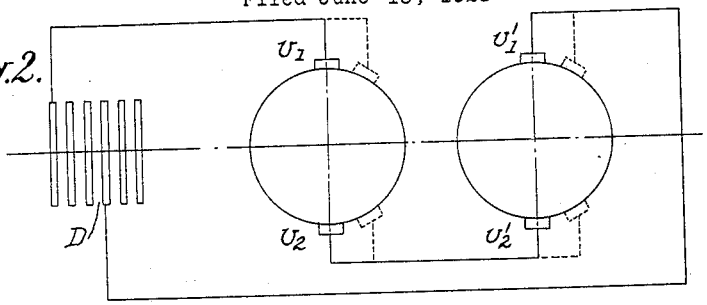
Figure 2 represents the arrangement of the commutator brushes of the double frequency changer.

Referring to Figure 1 of the drawings, the generator comprises an asynchronous machine A, similar to an induction motor, but driven by a prime mover (represented conventionally as a turbine E), and a regulating group consisting of two frequency changers $C_1$ $C_2$, all having their rotors driven in unison by said prime mover. The slip rings D of the generator are connected to the commutators $M_1$ $M_2$ of the two frequency changers in such a way that the diametrical voltages $V_1$ $V_2$ and $V'_1$ and $V'_2$ (Figure 2) shall be in series; for the sake of clearness, the connections in Figure 1 are shown only for two of the six slip rings D and for one brush of each set of three upon the two commutators. The slip rings $B_1$ $B_2$ of the two frequency changers are supplied by the separate secondary windings $T_1$ $T_2$ of one transformer T, of which the primary windings are connected through inductances L to the supply system.

Figure 5:
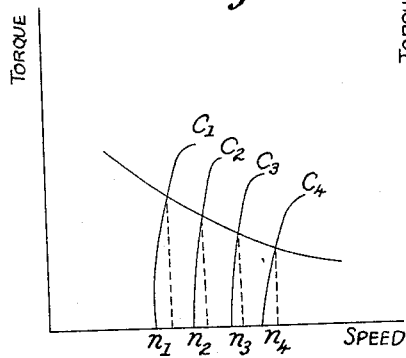

The machine may be realized by utilizing the regulating group in cascade connection upon the part of its working diagram which corresponds to running as a generator. Without making any alteration to its connections when run as a motor, the group is driven above the no-load speed which it would have in running as a motor; it then operates as a generator to feed the supply system. The torque-speed characteristic of the generator can be displaced parallel to itself as at $c$, $c_2$, $c_3$, $c_4$ in Figure 5, so as to obtain by its intersection with the torque-speed curve of the turbine the different speeds desired $n$, $n_2$, $n_3$, $n_4$.

Figure 6:
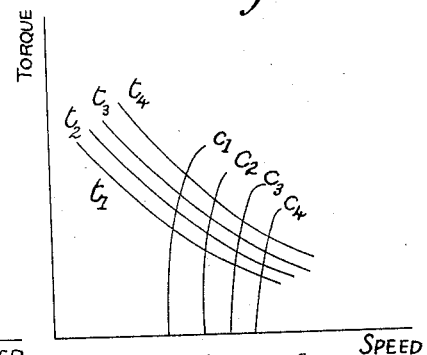

There might likewise be employed the points of intersection of these various characteristics $c_1$ $c_2$ $c_3$ $c_4$ with the group of corresponding curves $t_1$ $t_2$ $t_3$ $t_4$ of the turbine, as in Figure 6, there being utilized only a single point of each such characteristic $t_1$ $t_2$ $t_3$ $t_4$, being the point corresponding to the most efficient working of the turbine. This displacement of the characteristic is obtained by modifying the relative position of the two sets of brushes in the most suitable manner to obtain not only the desired speed but also the most favorable power factor.

Figure 3:
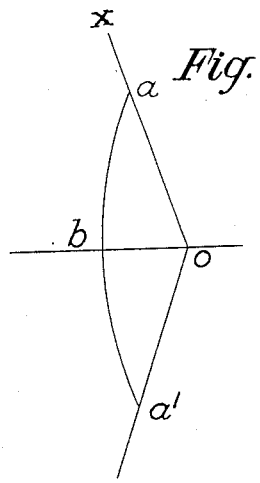
Figures 3, 4, 5 and 6 are explanatory diagrams referred to hereafter.

In order to attain this result in generator running, it is advantageous that the magnitude and the phase of the resultant voltage applied by the two frequency changers C, C$_2$ to the slip rings D of the main induction machine shall vary according to the law represented by the curve shown in Figure 3: the reference line (direction $o$ $b$ is at 90° to the voltage of the supply system, and the curve $a$ $b$ $a'$ is the locus of the extremity of the vector $o$ $a$ representing the resultant voltage produced by the two frequency changers C$_1$ C$_2$.

At high speed, the resultant voltage $oa$ must be a maximum and must have a given phase according to a direction represented by $ox$. At the speed of synchronism, the resultant voltage $ob$ must be reduced in a certain ratio and displaced angularly by 80° from $oa$. Lastly, at low speed, the resultant voltage must be as represented at $oa'$ symmetrically with relation to $oa$. At intermediate speeds, the extremity of the resultant voltage vector must lie upon the curve $a$ $b$ $a'$.

It is possible to obtain a variation of this kind by a symmetrical angular displacement of each of the sets of three-phase brushes on each of the commutators M, M$_2$, utilizing two frequency changer units C, C$_2$ arranged for slightly different radial voltage U$_1$ U$_2$, defined in magnitude by the relations:—

$$U_1 + U_2 = oa$$
$$U_1 - U_2 = ob$$

Figure 4:
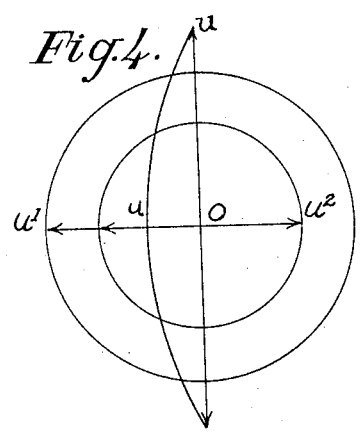

Figure 4, where the base line through $o$ is at 90° to the supply system voltage, which is perpendicular to $u_1$ $u_2$, illustrates the law governing the resultant voltage obtained by means of two frequency changers C$_1$ C$_2$ fed with different voltages $ou_1$ and $ou_2$. Then U$_1 = ou_1$ and U$_2 = ou_2$ will be the two diametrical voltages, that is, the voltages measured on each commutator M$_1$ or M$_2$ between two diametrically placed brushes.

When these two voltages lie in the vertical axis of the figure, the resultant is:

$$ou = ou_1 + ou_2.$$

If the two vectors are both displaced angularly through the same angle $\alpha$ in opposite directions, the resultant voltage $\overline{ou}$ varies in magnitude and in phase.

For $\alpha = 90°$, the two vectors will be opposite and the resultant will be:

$$\overline{ou} = ou_1 - ou_2.$$

The law represented in Figure 3 for the angular displacements will thus in fact be fulfilled. In order that the generator shall operate upon a suitable torque-speed characteristic, it will be necessary to shift the brushes in accordance with the speed of rotation, so that the end of the resultant voltage vector describes the curve $a$ $b$ $a'$.

Moreover the shifting of the respective sets of brushes of the two commutator machines, in order to modify their relative positions, must be carried out symmetrically, by which is meant that both sets of brushes must be shifted at the same rate and in the same direction (for example, clockwise) as viewed from the front end of the respective commutator. By such symmetrical shifting of the brushes, the vectors representing the voltages of the two commutator machines will be caused to turn through equal angles in opposite directions, as required by the law stated above.

It is to be noted that this angular displacement law does not suit the condition of running as a motor, for the power factor and the torque then become inadmissible for angular displacements greater than $\alpha = 160°$; the machines will then be used inefficiently, because it is not possible to vary the speed as much as the voltage for which they are designed would allow.

It is to be noted that at high speed the machine operating as above described works in unfavorable conditions in the vicinity of its dissynchronizing torque; it is consequently not adapted for any appreciable overload.

The invention provides for overcoming this drawback by the inclusion of the inductance L in the supply circuit to the slip-rings of the double or two-part frequency changes, with a view to maintaining a favorable torque-characteristic up to the highest speed.

What I claim is:—

1. A variable speed alternating current generator, comprising an induction machine and two separate but complementary commutator machines coupled mechanically thereto, said commutator machines being directly connected by their commutator brushes with the rotor slip rings of said induction machine, means for feeding alternating current to the rotors of said commutator machines, said commutator machines providing unequal voltages, and means for modifying symmetrically the relative position of the two sets of commutator brushes for varying the resultant of said unequal voltages.

2. A variable speed alternating current generator, comprising an induction machine having a wound rotor, a frequency changer consisting of two separate but complementary commutator machines having their rotors coupled mechanically to said wound rotor, means for feeding alternating current at unequal voltages to the rotors of said separate frequency changer machines, and means for applying to the slip rings of said wound rotor the resultant voltage produced by the series-connection of corresponding commutator brushes of said separate frequency changer machines, the relative position of the respective sets of commutator brushes of said frequency changer being variable symmetrically for determining said resultant voltage.

3. An asynchronous alternating current generator driven at variable speed and giving at its terminals a constant voltage and frequency, comprising an induction machine and two separate but complementary commutator machines forming a frequency changer for supplying a regulating voltage to the rotor of said induction machine, said commutator machines being coupled mechanically with the rotor of said induction machine, and means for feeding alternating current to the rotors of said commutator machines, the resultant voltage applied by said frequency changer to the rotor of said induction machine being variable by symmetrical shifting of the respective sets of commutator brushes of said commutator machines according to the speed at which said induction machine is driven.

4. An alternating current generator, comprising an induction machine and two separate but complementary commutator machines forming a frequency changer coupled mechanically with said induction machine, said commutator machines having their brushes connected directly with the rotor slip rings of said induction machine and being arranged for producing slightly different voltages at diametrically opposite brushes, and means for feeding alternating current to the rotors of said commutator machines, the two sets of brushes of said commutator machines being displaceable angularly in symmetrical relation, whereby the resultant voltage applied by said frequency changer to the rotor of said induction machine is varied in magnitude and phase.

5. An alternating current generator, comprising an induction machine and two separate but complementary commutator machines coupled mechanically thereto, said commutator machines forming a frequency changer and having their brushes connected directly with the rotor slip rings of said induction machine, a transformer having separate secondary windings, a source of supply for said transformer, means for feeding alternating current at unequal voltages to the rotors of said commutator machines from the separate secondary windings of said transformer, and means for varying the resultant of said unequal voltages by shifting said brushes symmetrically in the same direction upon said commutator machines, said resultant being applied by said commutator machines to the rotor of said induction machine.

6. An alternating current generator, comprising an induction machine and two separate but complementary commutator machines forming a frequency changer, said commutator machines being coupled mechanically with said induction machine and having their rotors cascaded with the rotor of said induction machine to apply thereto the resultant of their commutator voltages, a transformer having primary and separate secondary windings, an inductance connected in the supply circuit to the primary windings of said transformer to improve the torque-characteristic at high speeds, and means for feeding alternating current to the respective rotors of said commutator machines from the separate secondary windings of said transformer, the resultant voltage applied by said commutator machines to the rotor of said induction machine being variable to suit the speed of said machine.

7. A variable speed alternating current generator, comprising an induction machine and two separate but complementary commutator machines forming a frequency changer and giving slightly different voltages at their respective commutators, said commutator machines being coupled mechanically with said induction machine and having their rotors cascaded with the rotor of said induction machine to apply thereto the resultant of their commutator voltages, a transformer having primary and separate secondary windings, an inductance connected in the supply circuit to the primary windings of said transformer, and means for feeding alternating current to the respective rotors of said commutator machines from the separate secondary windings of said transformer, the resultant voltage applied by said commutator machines to the rotor of said induction machine being variable by symmetrical shifting of the brushes according to the speed.

8. A variable speed alternating current generator, comprising an induction machine and two separate but complementary commutator machines forming a frequency changer and producing slightly different voltages at their respective commutators, said commutator machines being coupled mechanically with said induction machine and having their rotors cascaded with the rotor of said induction machine to apply thereto the resultant of their commutator voltages, a transformer having primary and separate secondary windings, an inductance connected in the supply circuit to the primary windings of said transformer, and means for feeding the alternating current to the respective rotors of said commutator machines from the separate secondary windings of said transformer, the relative position of the two sets of commutator brushes of said frequency changer being variable according to the driving speed.

In testimony whereof I hereunto affix my signature.

PIERRE LETRILLIART.